United States Patent
Cannon et al.

(10) Patent No.: US 6,963,763 B1
(45) Date of Patent: Nov. 8, 2005

(54) METHODS AND DEVICES FOR CONTROLLING THE CONNECTION OF POWER SUPPLIES TO CIRCUITRY WITHIN RECHARGEABLE DEVICES

(75) Inventors: Joseph M. Cannon, Harleysville, PA (US); James A. Johanson, Macungie, PA (US); Richard L. McDowell, Chalfont, PA (US); Philip D. Mooney, North Wales, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/478,883

(22) Filed: Jan. 7, 2000

(51) Int. Cl.$^7$ ................................................ H04B 1/38
(52) U.S. Cl. ...................... 455/573; 455/572; 455/574
(58) Field of Search .............................. 455/573, 572, 455/574, 575.1, 550.1, 569.1, 569.2

(56) References Cited

U.S. PATENT DOCUMENTS

| | | | | |
|---|---|---|---|---|
| 4,458,111 A | * | 7/1984 | Sugihara | ..................... 455/573 |
| 4,788,486 A | * | 11/1988 | Mashino et al. | ............. 320/123 |
| 5,687,228 A | * | 11/1997 | Ellington et al. | ............ 379/395 |
| 5,898,908 A | * | 4/1999 | Griffin et al. | ............. 455/127.2 |
| 5,953,650 A | * | 9/1999 | Villevieille | ............... 455/404.2 |
| 6,058,320 A | * | 5/2000 | Yokota | ......................... 455/574 |
| 6,236,326 B1 | * | 5/2001 | Murphy | ................... 340/636.1 |
| 6,427,072 B1 | * | 7/2002 | Reichelt | ................... 455/404.1 |
| 6,545,446 B2 | * | 4/2003 | Isomichi et al. | ............. 320/128 |
| 6,668,179 B2 | * | 12/2003 | Jiang | .......................... 455/572 |

* cited by examiner

Primary Examiner—Bonny Trinh

(57) ABSTRACT

The present invention provides a device for connecting a power supply to a rechargeable device, in which a detection unit is adapted to detect power levels of a battery to output a first signal when a low power level of the battery is detected, and a second signal when a sufficient power level of the battery is detected. A power control unit is adapted to receive the first and second signals, and to disconnect circuitry in the rechargeable device from the battery when the first signal is asserted, and to connect the circuitry in the rechargeable device to the battery when the second signal is asserted.

87 Claims, 1 Drawing Sheet

METHODS AND DEVICES FOR CONTROLLING THE CONNECTION OF POWER SUPPLIES TO CIRCUITRY WITHIN RECHARGEABLE DEVICES

BACKGROUND OF THE INVENTION

Few would deny the advantages offered by devices which are powered by batteries versus those which need to be physically connected to a power supply or an electrical outlet. The communications industry has moved rapidly to introduce both cordless and wireless devices designed to run primarily on batteries. As anyone who has used a battery powered device knows, though, batteries run down and need to be replaced or recharged. One type of rechargeable device is a cordless telephone. There exists cordless telephones which are made up of a base and a handset. Typically, the handset is powered by a battery of some sort. When the battery runs down most telephones allow the handset's battery to be recharged by placing it into the base. This is referred to as placing the handset into the cradle of the base (hereafter an "in cradle" state). Once the battery in the handset has been recharged the handset can be taken out of the base and used. This is referred to as taking the handset out of the cradle (hereafter "out of cradle" state). During the time the handset is in the in-cradle state and its' battery is recharging the handset cannot be used for incoming or outgoing telephone calls. In addition, most telephones are not designed to allow the handset to communicate with the base in order to exchange registration information nor do they allow secondary features, such as caller-identification, to function until the battery is sufficiently recharged.

It is desirable to have a rechargeable device, such as a cordless telephone handset, which could operate while its' battery is recharging from a dead battery state.

Accordingly, it is an object of the present invention to provide for methods and devices for controlling the connection of a power supply or supplies to circuitry of a rechargeable device, such as a cordless telephone handset, to allow the circuitry to operate while a battery is recharging.

Other objectives, features and advantages of the present invention will become apparent to those skilled in the art from the following description taken in conjunction with the accompanying drawings.

SUMMARY OF THE INVENTION

In accordance with the present invention there are provided devices and methods for controlling the connection of a power supply or supplies to circuitry of a rechargeable device, such as a cordless telephone handset, to allow the circuitry to operate while the handset's battery is being recharged. Though the following discussion will focus on cordless telephones, it should be understood that the present invention is not so limited. Rather, the present invention applies to other rechargeable devices, such as wireless telephones, as well.

An illustrative embodiment of the present invention comprises a detection unit adapted to detect power levels of a handset battery and a power control unit adapted to connect or disconnect a power supply depending on the power level detected by the detection unit. If the detection unit determines that the handset's battery is running low on power it informs the control unit which disconnects the handset circuitry from the battery and places the circuitry into a dormant mode. Once the handset has been placed into the cradle of a complimentary base, the control unit is then adapted to connect the circuitry to a base power supply, such as an AC or DC (e.g., battery) supply. The control unit is also adapted to place the circuitry in an active mode. The circuitry remains connected to the base power supply until such time as the battery has recharged. Once the battery has been recharged the control unit is then adapted to disconnect the circuitry from the base power supply and reconnect it to the handset battery.

The present invention and its advantages can be best understood with reference to the drawings, detailed description of the invention and claims that follow.

DETAILED DESCRIPTION OF THE INVENTION

Figure 1:
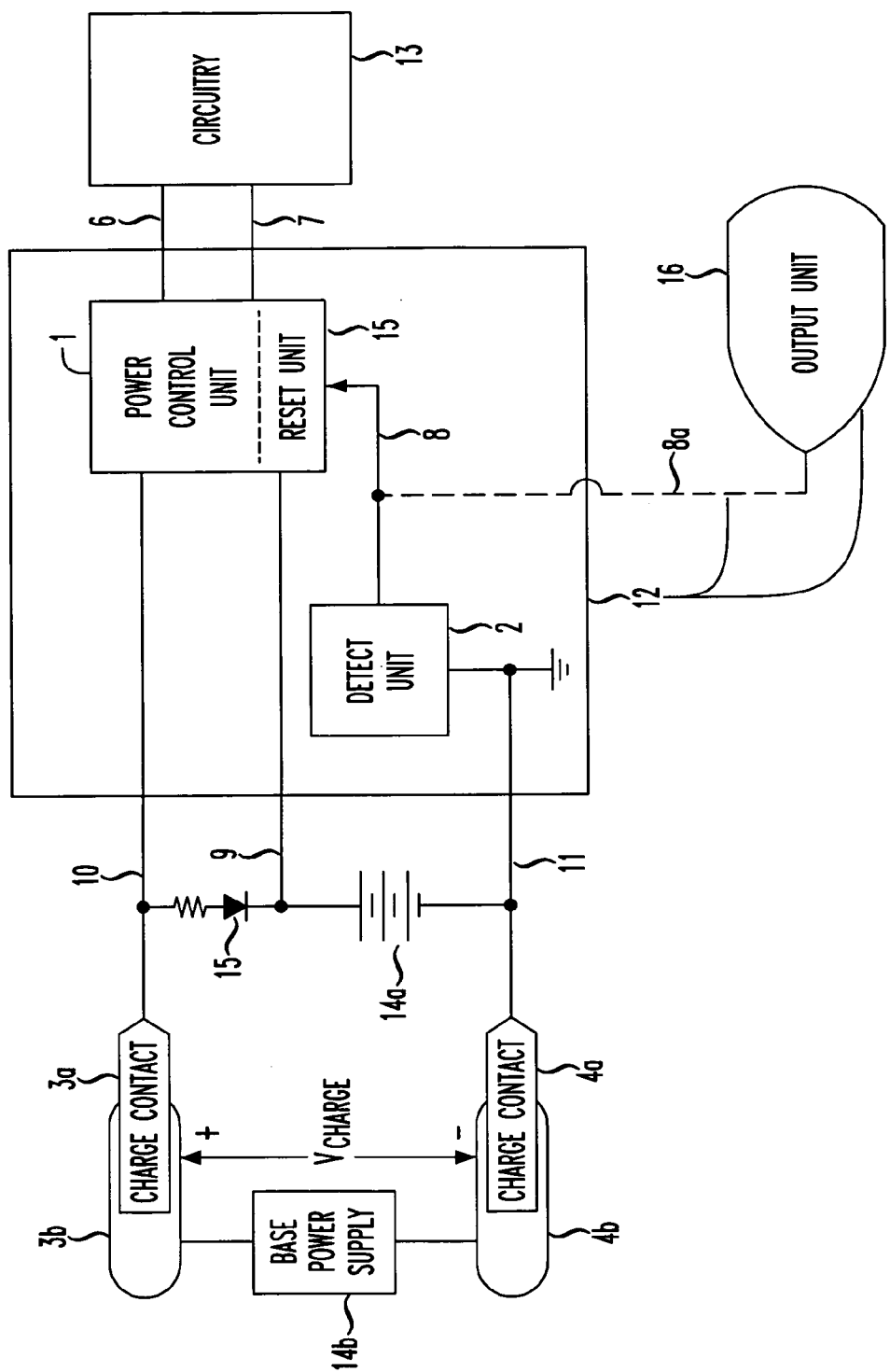
FIG. 1 depicts a device for controlling the connection of a power supply or supplies to circuitry of a rechargeable device, such as a cordless telephone handset, to allow the circuitry to operate while a battery is recharging.

FIG. 1 shows a device 12 for controlling the connection of a power supply 14a or 14b to handset circuitry 13 of a cordless telephone handset. FIG. 1 does not show all of the component parts of a cordless telephone handset, but it should be understood that the device 12, circuitry 13, handset battery 14a and diode 15 are some of the parts making up such a handset. As stated before, though the following explanation will assume that the device 12 is a part of a cordless telephone which includes a handset and base the present invention is not so limited. The device 12 may also be part of a number of rechargeable devices, such as a wireless telephone. In the explanation and examples which follow the word "circuitry" will be used to refer to components which are responsible for sending or receiving telephone calls, the registration process between the handset and its complimentary base and caller-identification processing to name just a few functions carried out by such circuitry.

One example of how the device 12 operates to control the connection of power supplies, and thus power, to circuitry 13 is as follows.

In an illustrative embodiment of the invention, the device 12 comprises a detection unit or means 2 connected to the terminals of handset battery 14a. The detection unit 2 is adapted to detect power levels of the battery 14a. After detecting certain power levels the detection unit 2 is further adapted to output signals via pathway 8 to a power control unit or means 1. More specifically, the detection unit 2 is adapted to detect a low power level of the battery 14a. In one embodiment of the present invention this low power level comprises a power level which is insufficient to power the circuitry 13. The detection unit 2 is likewise adapted to detect a sufficient power level, which is a power level which is sufficient to power the circuitry 13.

If the detection unit 2 detects a low power level it is adapted to output a first signal via pathway 8 to the power control unit 1. The power control unit 1 is adapted to receive the first signal and is further adapted to disconnect the handset battery 14a from circuitry 13. Once the battery 14a is disconnected from the circuitry 13 there is no longer a load on the battery 14a. This disconnection may result in a small increase in battery power being detected by the detection unit 2. Those skilled in the art may refer to this increase as "bounce back". In an alternative embodiment of the invention the detection unit 2 is further adapted to continue to output the first signal until the detected level reaches a sufficient power level even after the load is disconnected from the battery 14*a*. Said another way, the detection unit 2 is further adapted to ignore the small increase in power seen when the circuitry 13 is disconnected and continues to output the first signal. The reason for ignoring this increase is to avoid the possibility that the detection unit 2 may interpret the small increase as an indication that the battery 14*a* is sufficiently charged when, in fact, it is not.

Before going further, it should be understood that when "connection" or "disconnection" of the circuitry 13 or a power source is described, the connection/disconnection may be between the power control unit 1 and the circuitry 13 or between the power control unit 1 and the power source; both types of connections/disconnections are envisioned by the present invention.

In an illustrative embodiment of the invention, the detection unit 2 may be adapted to store at least a set of reference power levels. The first reference level is a level which is insufficient to operate the circuitry 13; the second reference level is a power level sufficient to operate the circuitry 13. These two levels are separated by an amount which is greater than the maximum bounce back level seen by the battery 14*a*. For example, if the first level is 3 volts the second level may be 3.5 volts. Thus, the detection unit 2 would be set to output the first signal when the battery's 14*a* voltage becomes equal to or less than 3 volts. At this level the power control unit 1 would disconnect the battery 14*a* from the circuitry 13. The battery 14*a* would then see a bounce back voltage, for example, an increase of 0.1 volts. The detection unit 2 would then detect a new voltage of 3.1 volts. Because this voltage is less than 3.5 volts, the detection unit 2 will not output a second signal along pathway 8 to the power control unit 1. Only when the battery voltage rises above 3.5 volts will the detection unit 2 output a second signal indicating that the battery 14*a* has been recharged.

Though the low power level described above is a level which is insufficient to power the circuitry 13, it should be understood that this level may also comprise another level set by the user or manufacturer of the handset for a particular application or feature. The above example illustrates the concept of hysteresis. The voltage levels are just one example of the levels which may be used.

Continuing, in addition to disconnecting the battery 14*a*, the power control unit 1 is further adapted to output a reset signal via pathway 6 or 7 to place the circuitry 13 in a first or reset mode. In one embodiment of the invention the handset is in an out-of-cradle state. In this state the power control unit 1 is adapted to place the circuitry 13 in the first mode of operation. Because the handset is in an out-of-cradle state and because its' battery 14*a* has run down, the first mode will most commonly comprise a "dormant" state; that is a state where the circuitry 13 is placed into a mode where its operation is suspended. As indicated in FIG. 1, the power control unit 1 is adapted to receive signals along pathways 9 and 10 indicating whether the handset is in an in-cradle or out of cradle state. In an alternative embodiment of the present invention, the power control unit 1 is further adapted to place the circuitry 13 in a second mode of operation when the handset is in an in-cradle state. As will be explained shortly, when the handset is placed into the cradle of the base, power is supplied to the circuitry 13 from the base. The power control unit 1 is adapted to detect when the handset has been so cradled and is further adapted to remove the reset signal present on pathway 6 or 7. This places the circuitry 13 in an "active" state; that is a state where the circuitry 13 is placed into a normal mode of operation. It should be understood that the power control unit 1 may place the circuitry 13 in either of the two modes depending on whether the handset has been cradled or not.

The explanation just given assumes that the reset function and signals are carried out by the power control unit 1. This may or may not be the case. In an alternative embodiment of the invention, the device 12 further comprises a separate reset unit or means 15 which may or may not be a part of power control unit 1 (as indicated by the dotted lines in FIG. 1). The reset unit 15 is adapted to carry out all of the reset functions described above with respect to the power control unit 1.

Backtracking a little, as long as the handset is in an out of cradle state and the battery 14*a* has reached a low power level the battery 14*a* will be disconnected from circuitry 13. In fact, as long as these two conditions exist the circuitry 13 will not be connected to any source of power.

This changes when the handset is cradled. Upon cradling, the power control unit 1 is adapted to detect a voltage across diode 15 indicating that the handset has been cradled. The power control power unit 1 is then adapted to connect the circuitry 13 to handset charging contacts 3*a*, 4*a* which have been cradled or connected to base charging contacts 3*b*, 4*b*. Because the base charging contacts 3*b*,4*b* are connected to a base power supply 14*b*, it can be said that the power control unit 1 is effectively adapted to connect the circuitry 13 to the base power supply 14*b* when the handset is placed in an in-cradle state. In one embodiment of the invention the base power supply 14*b* comprises a base battery or another DC power supply. In still another embodiment of the invention, the base power supply 14*b* comprises an AC power supply.

The power control unit 1 may be adapted to perform other functions other than connection/disconnection, detection of a cradling state and resetting the circuitry 13. For example, in a further embodiment of the present invention the power control unit 1 is adapted to provide regulated power to the circuitry 13 when the circuitry 13 is connected to the handset battery 14*a* or base power supply 14*b*.

Referring back to FIG. 1, it can be seen that the handset battery 14*a* is connected to the handset charging contacts 3*a*,4*a*. Thus, when the handset is cradled and base power is applied to the handset charging contacts 3*a*,4*a* the battery 14*a* begins to charge (or recharge). At some point the battery 14*a* obtains a charge sufficient enough to operate the circuitry 13. The detection unit 2 is adapted to detect such a sufficient power level of the battery 14*a* and is then further adapted to output a second signal along pathway 8 to the power control unit 1. Upon receiving the second signal, the power control unit 1 is adapted to disconnect the base power supply 14*b* from circuitry 13 and to connect the handset battery 14*a* to circuitry 13.

As with the low power level, it has been assumed that the "sufficient power level" is one which is needed to operate the circuitry 13. In alternative embodiments of the invention, the sufficient power level may comprise other levels, such as one above a bounce back voltage level but lower than a level needed to power all of the components of circuitry 13. Said another way, to the sufficient power level may comprise a level sufficient to operate some of the components, or to carry out some of the functions of, circuitry 13.

FIG. 1 shows the detection unit 2 and control unit 1 as block diagrams. It should be understood that although these units are shown as separate units they may be combined into one unit or further broken down into a number of units. In addition, these units may comprise a number of components. For example, in one embodiment of the invention, the power control unit 1 may comprise programmable units such as microprocessors or digital signal processors. In another embodiment the power control unit 1 comprises first and second regulators or regulator means adapted to carry out the same functions as described above.

By way of illustration, a first voltage regulator can be adapted to connect and/or disconnect the handset battery 14a from circuitry 13 while a second voltage regulator can be adapted to connect and/or disconnect charging contacts 3a,4a from circuitry 13 in order to connect/disconnect the base power supply 14b from circuitry 13.

More specifically, the first voltage regulator can be connected to the handset battery 14a and adapted to receive the second signal indicating the battery 14a is charged. The first voltage regulator can then be further adapted to connect the circuitry 13 to the handset battery 14a. In an alternative embodiment of the invention the first voltage regulator can be adapted to supply the circuitry 13 with regulated power from the battery 14a. If the detection unit 2 sends the first signal to the power control unit 1 indicating a low power level of the battery 14a, then the first voltage regulator can be further adapted to receive this first signal and to disconnect the handset battery 14a from circuitry 13.

We now turn to the second voltage regulator. The second voltage regulator can be connected to the handset charging contacts 3a,4a. When the handset is placed into an in-cradle state the second voltage regulator can be adapted to connect the circuitry 13 to the charging contacts 3a,4a. As before, this connection in turn allows the circuitry 13 to be connected to the base power supply 14b. As with the first voltage regulator, the second voltage regulator can be adapted to provide regulated power to the circuitry 13. Unlike the first voltage regulator, however, the second voltage regulator is adapted to provide regulated power from the base power supply 14b, not from the handset battery 14a.

The ability to supply the circuitry 13 with power when it is in an in-cradle state enables the circuitry to carry out a number of functions not normally possible when its own battery runs down. For example, the power supplied to the circuitry 13 may allow the circuitry to: (a) initiate a registration process between the handset and base; (b) initiate "quick charge" processes to hasten the charging of the battery 14a; (c) receive and display caller-identification information; (d) in the case where the handset is cradled to allow a user to access a keypad, enable the circuitry to work with the base in order to send or receive telephone calls while the handset is cradled in conjunction with a speakerphone located within the base; or (e) to send/receive commands to/from a telephone answering machine/device, to give just a few examples. It should be understood that these examples are by no means an exhaustive list of the types of functions which may be carried out by circuitry 13.

The first and second signals sent by the detection unit 2 can be used to carry out additional features besides the connection/disconnection of power supplies/handset circuitry. For example, in an alternative embodiment of the invention, the device 12 may comprise an output unit or means 16 adapted to receive the first and second signals along pathway 8a and further adapted to output an indication, such as a message or warning, indicating whether the battery 14a has been recharged (e.g., "do not remove handset until battery is charged"). Alternatively, the output unit 16 can be adapted to output an audio, video or similar signal indicating the recharging status of battery 14a. The output unit 16 can comprise any number of LED, LCD displays and/or audio components and the like to carry out the functions just described and may or may not be a component part of the device 12 (as indicated by the dotted lines).

Though the description above has focused on devices, the present invention also envisions methods for controlling the connection of power supplies to rechargeable devices.

It is to be understood that changes and variations may be made without departing from the spirit and scope of this invention as defined by the claims that follow.

We claim:

1. A device for connecting a power supply to a rechargeable device comprising:
   a detection unit adapted to detect power levels of a battery, further adapted to output a first signal when a low power level of the battery is detected and further adapted to output a second signal when a sufficient power level of the battery is detected; and
   a power control unit adapted to receive the first signal, further adapted to disconnect circuitry from the battery, and still further adapted to receive the second signal and to connect the circuitry to the battery.

2. The device as in claim 1 wherein the low power level comprises a power level which is insufficient to power the circuitry.

3. The device as in claim 1 wherein the power control unit is further adapted to place the circuitry in a first mode when a handset is in an out-of-cradle state.

4. The device as in claim 3 wherein the first mode comprises a dormant state.

5. The device as in claim 1 wherein the power control unit is further adapted to place the circuitry in a second mode when a handset is in an in-cradle state.

6. The device as in claim 5 wherein the second mode comprises an active state.

7. The device as in claim 1 further comprising a reset unit adapted to place the circuitry in a first or second mode.

8. The device as in claim 7 wherein the reset unit is further adapted to place the circuitry in the first mode when a handset is in an out-of-cradle state.

9. The device as in claim 8 wherein the first mode comprises a dormant state.

10. The device as in claim 7 wherein the reset unit is further adapted to place the circuitry in the second mode when a handset is in an in-cradle state.

11. The device as in claim 10 wherein the second mode comprises an active state.

12. The device as in claim 1 wherein the power control unit is further adapted to connect the circuitry to charging contacts when a handset is in an in-cradle state.

13. The device as in claim 12 wherein the power control unit is further adapted to connect the circuitry to a base power supply.

14. The device as in claim 13 wherein the base power supply comprises a battery.

15. The device as in claim 13 wherein the power control unit is further adapted to provide regulated power to the circuitry.

16. The device as in claim 12 further comprising a handset battery connected to the charging contacts and adapted to receive a charge from the charging contacts.

17. The device as in claim 1 wherein the sufficient power level comprises a level sufficient to power the circuitry.

18. The device as in claim 1 wherein the power control unit further comprises a first voltage regulator connected to the battery and adapted to receive the second signal and further adapted to connect the circuitry to the battery.

19. The device as in claim 18 wherein the first voltage regulator further adapted to supply the circuitry with regulated power.

20. The device as in claim 1 wherein the power control unit further comprises a first voltage regulator connected to the battery.

21. The device as in claim 20 wherein the first voltage regulator is further adapted to receive the first signal and to disconnect the battery from the circuitry.

22. The device as in claim 1 wherein the power control unit further comprises a second voltage regulator connected to charging contacts.

23. The device as in claim 22 wherein the second voltage regulator is further adapted to connect the circuitry to the charging contacts when a handset is in an in-cradle state.

24. The device as in claim 23 wherein the second voltage regulator is further adapted to connect the circuitry to a base power supply.

25. The device as in claim 23 wherein the second voltage regulator is further adapted to provide regulated power to the circuitry.

26. The device as in claim 1 wherein the battery comprises a cordless telephone handset battery.

27. The device as in claim 1 wherein the battery comprises a wireless telephone handset battery.

28. The device as in claim 1 wherein the detection unit is further adapted to output the first signal until a sufficient power level is detected.

29. The device as in claim 1 further comprising an output unit adapted to output an indication of whether the battery has been recharged.

30. A method for connecting a power supply to a rechargeable device comprising:
   detecting power levels of a battery;
   outputting a first signal when a low power level of the battery is detected, receiving the first signal, and disconnecting circuitry from the battery; and
   outputting a second signal when a sufficient power level of the battery is detected, receiving the second signal, and connecting the circuitry to the battery.

31. The method as in claim 30 wherein the low power level comprises a power level which is insufficient to power the circuitry.

32. The method as in claim 30 further comprising placing the circuitry in first mode when a handset is in an out-of-cradle state.

33. The method as in claim 32 wherein the first mode comprises a dormant state.

34. The method as in claim 30 further comprising placing the circuitry in a second mode when a handset is in an in-cradle state.

35. The method as in claim 34 wherein the second mode comprises an active state.

36. The method as in claim 30 further comprising placing the circuitry in a first or second mode.

37. The method as in claim 36 further comprising placing the circuitry in the first mode when a handset is in an out-of-cradle state.

38. The method as in claim 37 wherein the first mode comprises a dormant state.

39. The method as in claim 36 further comprising placing the circuitry in the second mode when a handset is in an in-cradle state.

40. The method as in claim 39 wherein the second mode comprises an active state.

41. The method as in claim 30 further comprising connecting the circuitry to charging contacts when a handset is in an in-cradle state.

42. The method as in claim 41 wherein further comprising connecting the circuitry to a base power supply.

43. The method as in claim 42 wherein the base power supply comprises a battery.

44. The method as in claim 42 further comprising providing regulated power to the circuitry.

45. The method as in claim 41 further comprising connecting a handset battery to the charging contacts.

46. The method as in claim 30 wherein the sufficient power level comprises a level sufficient to power the circuitry.

47. The method as in claim 30 further comprising connecting a first voltage regulator to the battery and connecting the circuitry to the battery.

48. The method as in claim 47 wherein further comprising supplying the circuitry with regulated power from the first voltage regulator.

49. The method as in claim 30 further comprising connecting a first voltage regulator to a handset battery.

50. The method as in claim 49 further comprising disconnecting the handset battery from the circuitry when the first voltage regulator receives the first signal.

51. The method as in claim 30 further comprising connecting a second voltage regulator to charging contacts.

52. The method as in claim 51 further comprising connecting the circuitry to the charging contacts when a handset is in an in-cradle state.

53. The method as in claim 52 further comprising connecting the circuitry to a base power supply.

54. The method as in claim 53 further comprising providing regulated power to the circuitry.

55. The method as in claim 30 wherein the battery comprises a cordless telephone handset battery.

56. The method as in claim 30 wherein the battery comprises a wireless telephone handset battery.

57. The method as in claim 30 further comprising outputting the first signal until a sufficient power level is detected.

58. The method as in claim 30 further comprising outputting an indication of whether the battery is recharged.

59. A device for connecting a power supply to a rechargeable device comprising:
   detection means for detecting power levels of a battery, for outputting a first signal when a low power level of the battery is detected, and for outputting a second signal when a sufficient power level of the battery is detected; and
   power control means for receiving the first and second signal and for disconnecting circuitry from the battery in response to the first signal, and for connecting the circuitry to the battery in response to the second signal.

60. The device as in claim 59 wherein the low power level comprises a power level which is insufficient to power the circuitry.

61. The device as in claim 59 wherein the power control means is further adapted to place the circuitry in a first mode when a handset is in an out-of-cradle state.

62. The device as in claim 61 wherein the first mode comprises a dormant state.

63. The device as in claim 59 wherein the power control means is further adapted to place the circuitry in a second mode when a handset is in an in-cradle state.

64. The device as in claim 63 wherein the second mode comprises an active state.

65. The device as in claim 59 further comprising reset means for placing the circuitry in a first or second mode.

66. The device as in claim 65 wherein the reset means is farther adapted to place the circuitry in the first mode when a handset is in an out-of-cradle state.

67. The device as in claim 66 wherein the first mode comprises a dormant state.

68. The device as in claim 65 wherein the reset means is further adapted to place the circuitry in the second mode when a handset is in an in-cradle state.

69. The device as in claim 68 wherein the second mode comprises an active state.

70. The device as in claim 59 wherein the power control means is further adapted to connect the circuitry to charging contacts when a handset is in an in-cradle state.

71. The device as in claim 70 wherein the power control means is further adapted to connect the circuitry to a base power supply.

72. The device as in claim 71 wherein the base power supply comprises a battery.

73. The device as in claim 71 wherein the power control means is further adapted to provide regulated power to the circuitry.

74. The device as in claim 70 further comprising a handset battery connected to the charging contacts and adapted to receive a charge from the charging contacts.

75. The device as in claim 59 wherein the sufficient power level comprises a level sufficient to power the circuitry.

76. The device as in claim 59 wherein the power control means further comprises first voltage regulator means connected to the battery for receiving the second signal and further adapted to connect the circuitry to the battery.

77. The device as in claim 76 wherein the first voltage regulator means is further adapted to supply the circuitry with regulated power.

78. The device as in claim 59 wherein the power control means further comprises first voltage regulator means connected to the battery.

79. The device as in claim 78 wherein the first voltage regulator mean is further adapted to receive the first signal and to disconnect the battery from the circuitry.

80. The device as in claim 59 wherein the power control means further comprises second voltage regulator means connected to charging contacts.

81. The device as in claim 80 wherein the second voltage regulator means is further adapted to connect the circuitry to the charging contacts when a handset is in an in-cradle state.

82. The device as in claim 81 wherein the second voltage regulator means is further adapted to connect the circuitry to a base power supply.

83. The device as in claim 81 wherein the second voltage regulator means is further adapted to provide regulated power to the circuitry.

84. The device as in claim 59 wherein the battery comprises a cordless telephone handset battery.

85. The device as in claim 59 wherein the battery comprises a wireless telephone handset battery.

86. The device as in claim 59 wherein the detection means is further adapted to output the first signal until a sufficient power level is detected.

87. The device as in claim 59 further comprising output means for outputting an indication of whether the battery has been recharged.

* * * * *